UNITED STATES PATENT OFFICE.

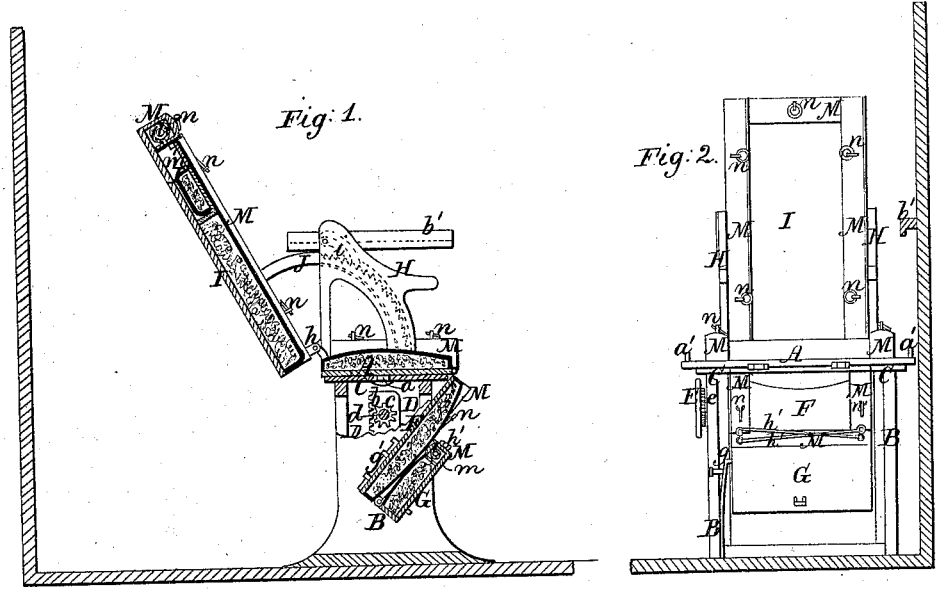

JONATHAN GOOD, OF PHILADELPHIA, PENNSYLVANIA, ASSIGNOR TO HIMSELF AND B. L. H. DABBS, OF SAME PLACE.

RAILROAD-CAR SEAT AND COUCH.

Specification of Letters Patent No. 23,061, dated February 22, 1859.

*To all whom it may concern:*

Be it known that I, JONATHAN GOOD, of the city of Philadelphia, in the county of Philadelphia and State of Pennsylvania, have invented a new and useful Combined Railroad-Car Seat and Couch; and I do hereby declare that the following is a full, clear, and exact description of the same, reference being had to the accompanying drawings, in which—

Figure 1, represents a vertical longitudinal section of my seats arranged for persons in a sitting position. Fig. 2, is a transverse vertical section of a portion of a rail road car, showing a front elevation of one of my seats, and Fig. 3, is a longitudinal vertical section of a rail road car with the seats arranged as sleeping couches.

Similar letters of reference indicate corresponding parts in the several figures.

To enable others skilled in the art to fully understand and construct my arrangement, I will proceed to describe the same.

The seats A, are supported by the stationary legs B, B, and they are attached to a plate C, by means of a pivot $a$, said pivot moving in a longitudinal slot so that the seat may be brought to a position sufficiently distant from the side of the car as to allow of reversing the same. In every other seat the plate C, slides up and down by means of extensions D, one of which is provided with a toothed rack $b$, which gears into a pinion $c$, said pinion being rigidly attached to an axle $d$, which is operated by means of a hand wheel E, so that the seat may be raised as represented in Fig. 3, and when so raised projections $a'$, which extend over the sides of the seat fit into hooks $b'$, which are attached to the sides of the car. In order to prevent its going back by its own gravity a ratchet wheel $e$, is attached to the axle $d$, and a pawl $f$, serves to arrest this wheel after the seat has been raised. It will be observed that the plate C has a triple movement, viz. it is capable of being turned on its pivot, of moving horizontally, and of rising vertically. To each seat two additional cushions F, and G, are hinged, and the two are also united by hinges to each other so that they fold up and that they may be partly turned under the seat as represented in Fig. 1, so as not to interfere with the legs of a person sitting on the seat, and in this position the two cushions are secured by means of a spring hook $g$, which fits into a notch in the frame of the cushion G. A bolt $g'$, is attached to the under side of the frame of the cushion F, and hooks $h'$, $h'$, are pivoted to the outer edge of the frame of the cushion G, the bolt serving to make the cushions F, and G, rigid when brought in a horizontal position, and the hooks serving to suspend the cushion G, from the roof of the car.

Projecting above the seats and attached to the plate C, are the bows H, to the lower portions of which the backs I, are hinged by hinges $h$, and these bows serve as arm pieces and at the same time as guides for the backs as they form slides for the curved plates J, which are attached one to each side of the backs. The upper edge of these plates is provided with rack teeth and a click $i$, serves to arrest the back in any desired inclination. The cushion in the outer end of the back is separated from the rest and the part L, of the same is so arranged that it may be turned out as represented in Fig. 3, and that the same, when brought in this position forms a pillow, while at the same time the recess $m'$ left by the same in the upper portion of the back serves as a receptacle for those clothes or wearing apparel which persons generally don't like to wear when lying down to sleep.

Small boxes M, are attached to the sides of the back as well as of the seat and all of the additional cushions F, and G, and curtains $l$, are placed in these boxes, rolled up on arbors $m$, and so arranged, that they can be withdrawn from said boxes by means of rings $n$, and hooked into proper hooks which are attached to the roof of the car.

The operation is as follows: For persons in a sitting position the seats are arranged as represented in Figs. 1 and 2, the inclination of the back being adjusted by means of the rack teeth on the upper edge of the curved plates J, and the click $i$, and if the seat is to be reversed, the cushions F, and G, are released from the hooks $g$, and brought in a vertical position, the seat is moved from the side of the car as far as the pivot $a$, will allow and it is then turned on this pivot and the cushions F and G, are again fastened under the seat by the spring hook $g$. In order to arrange the seats for sleeping couches, every other seat is raised as represented in Fig. 3, by means of the hand wheel E, the backs are let down to a horizontal position and the cushions F, and G, are brought up to a horizontal position and fastened by means of the bolt $g'$, and secured to the roof of the car by means of the hooks $h'$, $h'$. The pillow L, is turned up and the curtains $l$, are raised and fastened to the roof by means of the rings $n$, and the sleeping couch is ready. It will be observed that by means of these curtains each couch is made perfectly private, the curtains from the lower couches being attached to the under sides of the upper ones. The red lines in Fig. 3, indicate the manner, in which the two rows of sleeping couches are arranged through the full length of the car.

Having thus described my invention what I claim as new and desire to secure by Letters Patent, is—

The arrangement and combination of the pivoted, horizontally, and vertically moving plate C, curved ratchet plates J, rack extension D, and pinion ($c$), as and for the purpose herein shown and described.

JONATHAN GOOD.

Witnesses:
JOHN R. CLEMONS,
DAVID BEITLER.